United States Patent [19]

Reese et al.

[11] Patent Number: 5,631,319
[45] Date of Patent: May 20, 1997

[54] PRESSURIZED, BLOWING-AGENT-CONTAINING ISOCYANATE SEMIPREPOLYMER MIXTURES BASED ON MIXTURES OF POLYHYDROXYL COMPOUNDS AND MONOALCOHOLS AND/OR HYDROXYKETONES, THE USE THEREOF FOR THE PRODUCTION OF POLYURETHANE FOAMS, AND A PROCESS THEREFOR

[75] Inventors: Hans-Juergen Reese, Schwarzheide; Franz Heimpel, Affing; Heinz Forster, Wolfratshausen, all of Germany

[73] Assignee: BASF Aktiengesellschaft, Ludwigshafen, Germany

[21] Appl. No.: 564,027

[22] Filed: Nov. 29, 1995

[30] Foreign Application Priority Data

Dec. 6, 1994 [DE] Germany .................. 44 43 432.4

[51] Int. Cl.⁶ .................. C08J 9/00; C08K 3/20; C08L 75/00; C08G 18/00
[52] U.S. Cl. .................. 524/590; 521/87; 521/88; 521/137; 521/155; 521/159; 521/158; 521/170; 521/172; 521/173; 521/174; 521/914
[58] Field of Search .................. 521/87, 88, 137, 521/155, 159, 158, 170, 172, 173, 174, 914; 524/590

[56] References Cited

U.S. PATENT DOCUMENTS

| Re. 33,748 | 11/1991 | Meyborg et al. | 521/176 |
| 4,263,412 | 4/1981 | Pauls | 521/114 |
| 5,162,387 | 11/1992 | Abel et al. | 521/156 |

FOREIGN PATENT DOCUMENTS 2396035   7/1977   France .

*Primary Examiner*—Patrick Niland
*Attorney, Agent, or Firm*—Fernando A. Borrego

[57] ABSTRACT

The invention relates to pressurized, blowing-agent-containing isocyanate semiprepolymer mixtures, advantageously having an isocyanate content of from 5 to 25% by weight, based on organic polyisocyanates and polyhydroxyl compounds which are used in combination with a linear, branched or cyclic, saturated or olefinically unsaturated monoalcohol having 1 to 25 carbon atoms and/or hydroxyketones, preferably β-hydroxyketones, the use thereof for the production of one-component polyurethane foams by allowing the isocyanate semiprepolymer mixtures to depressurize, and a process therefor.

2 Claims, No Drawings

PRESSURIZED, BLOWING-AGENT-CONTAINING ISOCYANATE SEMIPREPOLYMER MIXTURES BASED ON MIXTURES OF POLYHYDROXYL COMPOUNDS AND MONOALCOHOLS AND/OR HYDROXYKETONES, THE USE THEREOF FOR THE PRODUCTION OF POLYURETHANE FOAMS, AND A PROCESS THEREFOR

The present invention relates to pressurized, blowing-agent-containing isocyanate semiprepolymer mixtures advantageously having an isocyanate content of from 5 to 25% by weight which are obtainable by reacting at least one polyhydroxyl compound (A) in combination with a linear, branched or cyclic, saturated or olefinically unsaturated monoalcohol having 1 to 25 carbon atoms (A1i) and/or a hydroxyketone (A1ii) with organic polyisocyanates (B) in a reactor in the presence of at least one blowing agent or subsequently treating the isocyanate semiprepolymers prepared in the absence of blowing agent with at least one blowing agent. The invention also relates to the use of the pressurized, blowing-agent-containing isocyanate semiprepolymer mixtures for the production of one-component polyurethane foams (polyurethane is also abbreviated to PU below) and to a process for the production of dimensionally stable PU foams by allowing pressurized isocyanate semiprepolymer mixtures to depressurize, reacting them with the atmosphere, preferably atmospheric moisture, and their curing. One-component PU foams of this type are used mainly in the construction sector, for example for filling cavities in construction and for the fixing of windows and doors in buildings.

One-component mixtures for the production of PU foams, their formative components and additives are known. They can be prepared by reacting, for example, polyhydroxyl compounds with a stoichiometric excess of organic polyisocyanates in the presence or absence of, for example, catalysts, stabilizers, blowing agents and, if desired, further additives to give an isocyanate semiprepolymer.

Pressurized isocyanate semiprepolymer mixtures containing blowing agents are usually prepared by the following methods.

In one process variant, the relatively high-molecular-weight polyhydroxyl compounds, catalysts, stabilizers and, if used, low-molecular-weight, hydroxyl-containing compounds and additives, for example flameproofing agents, plasticizers, dyes and pigments, are mixed and, as polyol component, reacted with the polyisocyanate component, which contains the organic polyisocyanates and, if desired, additives which are inert toward isocyanate groups. To this end, the polyol and polyisocyanate components can be introduced into a pressure container, for example an aerosol can, via suitable metering equipment, individually one after the other or simultaneously or in the form of a ready-prepared mixture from a suitable mixing apparatus. The filled pressure container is subsequently provided with a discharge valve and expediently charged via the latter with one or more blowing agents. If necessary, the pressure container can be treated in a tumbling or shaking unit in order to mix the isocyanate semiprepolymer and blowing agent(s) intensively.

In another process variant, the isocyanate semiprepolymers can be prepared in a manner known per se by reacting organic polyisocyanates initially introduced into a heatable stirred container with the polyhydroxyl compounds. If the isocyanate semiprepolymer preparation is carried out in the absence of catalysts, stabilizers and, if desired, other additives, these are introduced to the reaction mixture during or after the prepolymer formation. The isocyanate semiprepolymer mixture obtained as described above is transferred into a pressure container, and the latter is provided with a discharge valve and charged with the blowing agent or a blowing agent mixture.

Isocyanate semiprepolymer mixtures prepared by this process variant from polyhydroxyl compounds and excess polyisocyanates in the presence of catalysts and stabilizers must be mixed with a high content of pressure-liquefied blowing agents, preferably chlorofluorocarbons (CFCs) and/or fluorocarbons (FCs) in order to obtain foamable isocyanate semiprepolymer mixtures which have good flow properties and/or can be released from the pressure container in the requisite amounts.

The omission of CFCs, which endanger the ozone layer, and the need to use alternative, expensive blowing agents has led to attempts to prepare low-viscosity isocynate prepolymers by suitable measures.

Thus, DE-A-40 25 843 describes long-shelf-life, one-component mixtures which are used for the production of PU foams that have a dynamic viscosity of the isocyanate prepolymer of from 200 to 4000 mPa.s and contain carbon dioxide as blowing agent and plasticizers in order to reduce the viscosity. These one-component mixtures have the disadvantage that the plasticizers are not incorporated into the urethane structure and therefore tend to migrate out, causing shrinkage of the PU foam. According to EP-A-0 480 342, the one-component mixtures for the production of PU foams contain, as blowing agents, compressible gases such as helium, neon, argon, nitrogen, oxygen, carbon dioxide, laughing gas ($N_2O$) or air. Their low viscosity of from 500 to 12,000 mPa.s, preferably less than 10,000 mPa.s, measured out at 20° C., is achieved by also using viscosity-reducing solvents, for example ethers, esters or ketones, in particular acetone or methyl ethyl ketone, which themselves result in a softening of the polyurethane skeleton and thus cause increased shrinkage. The use of an expanded PU adhesive to bond insulating materials to building parts is described in DE-A-33 17 193 (U.S. Pat. No. 4,489,176). The PU preparations which cure in the presence of moisture with an increase in volume comprise up to 80% by weight of a PU prepolymer, foam stabilizers and from 10 to 20% by weight of a diluent having a boiling point of from room temperature to 60° C. High-boiling plasticizers, for example butyl benzyl phthalate, tris(monochloroisopropyl) or trichloroethyl phosphate, in combination with partially halogenated hydrocarbons, for example dichlorofluoromethane (R22), are, according to DE-A-38 29 104, used for the preparation of isocyanate prepolymer mixtures which react with moisture on discharge from a pressure container in liquid form to give PU foams. The last-mentioned process has the disadvantage that the additional use of diluents, plasticizers such as diphenyl cresyl phosphate or dioctyl phthalate, or high-boiling plasticizers favors and in many cases increases the tendency of the resultant PU foams to shrink.

EP-A-0 002 768 (U.S. Pat. No. 4,258,140) describes a process for the production of dimensionally stable, one-component PU foams by depressurizing a pressurized isocyanate semiprepolymer mixture based on difunctional to octafunctional polyester- and/or polyether-polyols having a hydroxyl number of from 40 to 500 which contain tertiary amino groups bonded in the polymer chain, and organic polyisocyanates, for example mixtures of diphenylmethane diisocyanate isomers (MDI) and polyphenyl-polymethylene polyisocyanates (abbreviated to crude MDI), and allowing the decompressed mixture to cure by means of atmospheric moisture. According to DE-A-28 42 246 (U.S. Pat. No. 4,263,412), isocyanate semiprepolymer mixtures having a relatively low content of blowing agents which can be used for the production of dimensionally stable, one-component PU foams can be introduced into the inner chamber of a two-chamber pressure pack containing a pressure medium in the outer chamber, and removed when required via a removal device.

Polyisocyanate polyaddition products are usually prepared using synthetic polyhydroxyl compounds, preferably polyester-polyols and polyoxyalkylene-polyols, as NCO-reactive compounds. However, it appears expedient from an ecological point of view to replace all or at least some of the synthetic polyhydroxyl compounds by hydroxyl-containing natural products. The use of renewable hydroxyl-containing natural products does not require complex industrial syntheses. It is furthermore advantageous that natural products obtained as waste in other areas can be used industrially, if necessary after minor industrial treatment and/or purification. The use of novel starting materials allows polyisocyanate polyaddition products having different mechanical properties to be produced, these in turn providing potential new uses. Examples of classical natural products already used in polyurethane chemistry as starting materials are natural oils, such as tall oil and castor oil, polyhydric alcohols, such as glycerol and the sugar alcohols, and fatty acids. An important waste material is lignin, which is an unavoidable by-product in the isolation of cellulose from wood.

It is an object of the present invention to produce using, for example, specifically composed mixtures of polyhydroxyl compounds, hydroxyl-containing natural products or polyhydroxyl compounds prepared therefrom, low-viscosity isocyanate semiprepolymers which are readily processable and, when mixed with a small amount of blowing agent, can be converted into one-component PU foams which have high dimensional stability, i.e. exhibit essentially no shrinkage.

We have found that, surprisingly, this object is achieved by using a mixture of at least one polyhydroxyl compound (A), for example a conventional polyoxyalkylene-polyol (A3) and/or preferably a hydroxyl-containing polyester (A2), and a monoalcohol (A1i) and/or a hydroxyketone (A1ii) to prepare the isocyanate semiprepolymer mixture.

The present invention accordingly provides a pressurized, blowing-agent-containing isocyanate semiprepolymer mixture obtainable by reacting A) at least one polyhydroxyl compound with
B) at least one organic polyisocyanate in a reactor in the presence of at least one blowing agent or by treating the isocyanate semiprepolymer formed in the absence of blowing agent with at least one blowing agent, wherein the polyhydroxyl compound (A) is used in combination with a linear, branched or cyclic, saturated or olefinically unsaturated monoalcohol having 1 to 25 carbon atoms (A1i) or a hydroxyketone (A1ii), or a mixture thereof.

The pressurized, blowing-agent-containing isocyanate semiprepolymer mixture is preferably prepared by reacting the polyhydroxyl compound (A) together with the monoalcohol (A1i) and/or hydroxyketone (A1ii) essential to the invention with the organic polyisocyanate (B) in the presence of C) catalysts,
D) surfactants and
E) if desired blowing agents and
F) if desired further additives.

The present invention furthermore provides the use of a pressurized, blowing-agent-containing isocyanate semiprepolymer mixture in a pressure container for the production of one-component PU foams by depressurizing the contents of the pressure container, and a process for the production of dimensionally stable PU foams by depressurizing and allowing to cure in the atmosphere, preferably atmospheric moisture, a storage-stable, pressurized, blowing-agent-containing isocyanate semiprepolymer mixture based on a polyhydroxyl compound (A) and an organic polyisocyanate (B), which comprises using the polyhydroxyl compound (A) in combination with a linear, branched or cyclic, saturated or olefinically unsaturated monoalcohol having 1 to 25 carbon atoms (A1i) or a hydroxyketone (A1ii), or a mixture thereof to prepare the isocyanate semiprepolymer.

The use of the polyhydroxyl compound (A), which preferably has a molecular weight of at least 300, in combination with the monofunctional alcohol (A1i) and/or hydroxyketone (A1ii) allows, through reaction with an excess of organic polyisocyanate, the preparation of an isocyanate semiprepolymer having a narrow molecular weight distribution and a molecular weight in the desired range. The use of polyfunctional and monofunctional hydroxyl compounds allows the increase in molecular weight and termination of the polyisocyanate polyaddition reaction to be controlled in a targeted manner and thus the viscosity and flowability of the isocyanate semiprepolymer to be modified. However, it is not only through the chemical structure and composition of the polyhydroxyl compounds (A), but also through the type, composition and amount of the organic polyisocyanates (B) that the physical and chemical properties, for example shelf life, reactivity, inter alia, of the isocyanate semiprepolymer and the mechanical properties of the PU foam produced therefrom can be modified and matched to the processing and use conditions. The preferred use of hydroxyl-containing polyesters having a molecular weight of at least 300 ensures, for example, an adequate increase in molecular weight and in addition counters possible embrittlement of the PU foam produced, in particular if the latter is rigid. The isocyanate semiprepolymers prepared in accordance with the invention have a relatively low viscosity, have good flow properties and can easily be converted into, preferably, rigid PU foam.

It is furthermore advantageous that virtually all of the isocyanate semiprepolymer mixture can be forced out of the pressure container using a significantly reduced amount of blowing agent.

The isocyanate semiprepolymers which can be used for the preparation of the pressurized, blowing-agent-containing isocyanate semiprepolymer mixtures expediently have an NCO content of from 5 to 25% by weight, preferably from 8 to 20% by weight, in particular from 9 to 13% by weight, based on the weight of the isocyanate semiprepolymer, and, as stated above, are prepared by reacting at least one polyhydroxyl compound (A) having a molecular weight of, preferably, at least 300, preferably at least one hydroxyl-containing polyester having a molecular weight of at least 300 (A2) or in particular a mixture of at least one hydroxyl-containing polyester (A2) and at least one polyoxyalkylene-polyol (A3) having a functionality of from 2 to 8 and a molecular weight of, preferably, at least 300 in combination with the linear, branched or cyclic, saturated or olefinically unsaturated monoalcohol (A1i) and/or hydroxyketone (A1ii) essential to the invention with at least one organic polyisocyanate, preferably a polyisocyanate mixture, for example at least one aliphatic, cycloaliphatic and/or preferably aromatic polyisocyanate, in the absence or preferably in the presence of catalysts (C) and surfactants (D). The preparation of the isocyanate semiprepolymer can furthermore be carried out in the presence or absence of blowing agents (E) and further additives (F), a preferred embodiment being carried out in the absence of blowing agents (E) since these are expediently then incorporated into the isocyanate semiprepolymer formed.

A) The polyhydroxyl compound (A) for the preparation of the isocyanate semiprepolymer is preferably a hydroxyl-containing polyester having a molecular weight of, preferably, at least 300, for example from 300 to 6000, which can be selected from the polyester-polyols known for the production of PU foams and preferably from the group consisting of polyester-polyols prepared by polycondensation of dicarboxylic acids and/or dicarboxylic acid derivatives, for example dicarboxylic acid monoalkyl and/or dialkyl esters and/or anhydrides, and preferably dihydric and/or trihydric alcohols, natural oils, modified natural oils prepared by the addition reaction of monohydric and/or polyhydric alcohols with epoxidized natural oils and dimeric fatty acid esters.

Suitable polyester-polyols may be prepared, for example, from organic dicarboxylic acids having 2 to 12 carbon atoms, preferably aliphatic dicarboxylic acids having 4 to 6 carbon atoms and/or fatty acids having 12 to 26 carbon atoms, preferably 14 to 18 carbon atoms, and polyhydric alcohols, preferably alkanediols having 2 to 12 carbon atoms, preferably 2 to 6 carbon atoms, dialkylene glycols and/or alkanetriols having 3 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. Examples of suitable fatty acids are lauric acid, myristic acid, palmitic acid and stearic acid. The mono- and dicarboxylic acids can be used either individually or mixed with one another. The free mono- and dicarboxylic acids may also be replaced by the corresponding carboxylic acid derivatives, for example dicarboxylic acid esters of alcohols having 1 to 4 carbon atoms or dicarboxylic anhydrides. Preference is given to dicarboxylic acid mixtures of succinic acid, glutaric acid and adipic acid in a mixing ratio of, for example, from 20 to 35:35 to 50:20 to 32 parts by weight, in particular adipic acid. Examples of dihydric and polyhydric alcohols, in particular alkanediols and dialkylene glycols, are ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol, 1,6-hexanediol, glycerol and mixtures of at least two of said alkanediols, in particular, for example, of 1,4-butanediol, 1,5-pentanediol and 1,6-hexanediol. Use may furthermore be made of polyester-polyols from lactones, for example ε-caprolactone, or hydroxycarboxylic acids, for example ω-hydroxycaproic acid.

The polyester-polyols can be prepared by polycondensing the organic, for example aromatic and preferably aliphatic monocarboxylic acids, polycarboxylic acids and/or derivatives thereof and polyhydric alcohols and/or alkylene glycols without using a catalyst or preferably in the presence of esterification catalysts, expediently in an inert-gas atmosphere, e.g. nitrogen, helium, argon, inter alia, in the melt at from 150° to 250° C., preferably at from 180° to 220° C., at atmospheric pressure or under reduced pressure until the desired acid number, which is advantageously less than 10, preferably less than 2, has been reached. In a preferred embodiment, the esterification mixture is polycondensed at the above temperatures to an acid number of from 80 to 30, preferably from 40 to 30, under atmospheric pressure and subsequently under a pressure of less than 500 mbar, preferably at from 50 to 150 mbar. Examples of suitable esterification catalysts are iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers, e.g. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of 2 to 4, in particular from 2 to 3, and a molecular weight of from 300 to 6000, preferably from 300 to 3000.

Examples of natural oils which may be mentioned are renewable raw materials, for example castor oil, soybean oil, colza oil, tall oil, rapeseed oil and linseed oil.

Examples of suitable modified natural oils are products of the alkoxylation of natural oils, products of the boiling of ketone-formaldehyde resins with hydroxy-functional natural products, for example natural oils, and preferably hydroxylated fatty acid compounds prepared by the addition reaction of monohydric and/or polyhydric alcohols with epoxidized natural oils, for example epoxidized soybean oil, epoxidized rapeseed oil fatty acid 2-ethylhexyl ester or epoxidized sunflower oil fatty acid diamide. Hydroxylated fatty acid compounds of the type mentioned by way of example are described, for example, in DE-A-32 46 612, (U.S. Pat. No. 4,886,893), EP-A-554 590, EP-A-0 600 958 and DE-C-41 25 031.

Suitable dimeric fatty acid esters are described, for example, in GB-A-879,517, GB-A-1,458,069, U.S. Pat. No. 3,349,049, U.S. Pat. No. 4,423,179 and EP-B-0 156 665 (U.S. Pat. No. 4,602,079). The hydroxyl-containing polyesters can be used individually or in the form of mixtures.

Other polyhydroxyl compounds which can be used are polyoxyalkylene-polyols, which are prepared by known processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide as catalysts and with addition of at least one initiator molecule containing from 2 to 8, preferably from 2 to 3, bonded reactive hydrogen atoms for the preparation of polyoxyalkylene-polyols for flexible PU foams and preferably containing from 3 to 8 bonded reactive hydrogen atoms for the preparation of polyoxyalkylene-polyols for semirigid and rigid PU foams, or by cationic polymerization using Lewis acids, such as antimony pentachloride, boron fluoride etherate inter alia, or bleaching earths as catalysts from one or more alkylens oxides having 2 to 4 carbon atoms in the alkylene radical.

Examples of suitable alkylene oxides are tetrahydrofuran, 1,3-propylene oxide, 1,2- and 2,3-butylene oxide and preferably ethylene oxide and 1,2-propylene oxide. The alkylene oxides can be used individually, alternatively one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having 1 to 4 carbon atoms in the alkyl radical, such as unsubstituted or mono- or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine, and 4,4'-, 2,4'- and 2,2'-diaminodiphenylmethane.

Other suitable initiator molecules are alkanolamines, for example ethanolamine, N-methyl- and N-ethylethanolamine, dialkanolamines, for example diethanolamine, N-methyl- and N-ethyldiethanolamine, and trialkanolamines, for example triethanolamine, and ammonia. Preference is given to polyhydric, in particular dihydric to octahydric alcohols and/or alkylene glycols, for example ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose, and mixtures of at least 2 polyhydric alcohols.

The polyoxyalkylene-polyols, preferably polyoxypropylene- and Polyoxypropylene-polyoxyethylene-polyols, have a functionality of from 2 to 8 and a molecular weight of from 300 to 8500, preferably from 600 to 7200, where, as stated above, isocyanate semiprepolymers for flexible PU foams are preferably prepared using polyoxyalkylene-polyols having a functionality of from 2 to 3 and a molecular weight of from 2800 to 6500 and those for semirigid and rigid PU foams are preferably prepared using polyoxyalkylene-polyols having a functionality of from 3 to 8 and a molecular weight of from 600 to 3900, and suitable polyoxytetramethylene glycols have a molecular weight of from 300 to approximately 3500.

Other polyoxyalkylene-polyols which have proven successful are alkoxylated lignins having molecular weights of, for example, from 1200 to 5200, preferably from 1500 to 3000, which expediently comprise lignin-initiated polyoxypropylenepolyols, or mixtures of such alkoxylated lignins. Also suitable, however, are, for example, lignin-initiated polyoxypropylene-polyoxyethylene-polyols and lignin-initiated polyoxyethylene-polyols, and mixtures of at least 2 of the lignin-containing polyoxyalkylene-polyols mentioned by way of example. Suitable lignin-containing polyoxyalkylene-polyols can be prepared, for example, by methods similar to those described in U.S. Pat. No. 3,546, 199 and U.S. Pat. No. 3,654,194, which are incorporated herein by way of reference.

The lignin-polyoxyalkylene-polyols are advantageously mixed with lignin-free polyoxyalkylene-polyols or hydroxyl-containing polyesters (A2), till the mixture of polyhydroxyl compounds (A) contains, for example, from 5 to 65% by weight, preferably from 8 to 20% by weight, based on the total weight, of lignin-polyoxyalkylene-polyols.

Other suitable polyoxyalkylene-polyols are polymer-modified polyoxyalkylene-polyols, preferably graft polyoxyalkylene-polyols, in particular those based on styrene and/or acrylonitrile and prepared by in-situ polymerization of acrylonitrile, styrene or preferably mixtures of styrene and acrylonitrile, for example in a weight ratio of from 90:10 to 10:90, preferably from 70:30 to 30:70, expediently in the abovementioned polyoxyalkylene-polyols by a method similar to that described in German Patents 11 11 394, 12 22 669 (U.S. Pat. Nos. 3,304,273, 3,383,351 and 3,523,093), 11 52 536 (GB 1,040,452) and 11 52 537 (GB 987,618), and polyoxyalkylene-polyol dispersions containing, as disperse phase, usually in an amount of from 1 to 50%, preferably from 2 to 25%, for example polyureas, polyhydrazides, polyurethanes containing bonded tertiary amino groups, and/or melamine and described, for example, in EP-B-011 752 (U.S. Pat. No. 4,304,708), U.S. Pat. No. 4,374,209 and DE-A-32 31 497.

Like the hydroxyl-containing polyesters (A2), the polyoxyalkylene-polyols (A3) can be used individually or in the form of mixtures. Furthermore, they can be mixed with the hydroxyl-containing polyesters or graft polyoxyalkylenepolyols and the hydroxyl-containing polyester-amides, polyacetals and/or polycarbonates.

Examples of suitable hydroxyl-containing polyacetals are the compounds which can be prepared from glycols, such as diethylene glycol, triethylene glycol, 4,4'-dihydroxyethoxy-diphenyldimethylmethane, hexanediol and formaldehyde. Suitable polyacetals can also be prepared by polymerizing cyclic acetals.

Depending on the use of the isocyanate semiprepolymer mixtures, the polyhydroxyl compounds (A) can be replaced in full or preferably in part by low-molecular-weight chain extenders and/or crosslinking agents. In the preparation of isocyanate semiprepolymers for flexible PU foams, the addition of chain extenders, crosslinking agents or alternatively mixtures thereof may prove advantageous for modifying the mechanical properties of the PU foams, for example the hardness. In the preparation of isocyanate semiprepolymers for rigid PU foams, the use of chain extenders and/or crosslinking agents is usually unnecessary. The chain extenders can be difunctional compounds and the crosslinking agents can be trifunctional or polyfunctional compounds, in each case having a molecular weight of less than 300, preferably from 62 to approximately 300. Examples of chain extenders which may be mentioned are alkanediols, for example those having 2 to 6 carbon atoms in the alkylene radical, for example ethanediol, 1,3-propanediol, 1,4-butanediol, 1,5-pentanediol and 1,6-hexanediol, and dialkylene glycols, for example diethylene glycol, dipropylene glycol and dibutylene glycol, and examples of crosslinking agents which may be mentioned are alkanolamines, for example ethanolamine, dialkanolamines, for example diethanoiamine, and trialkanolamines, for example triethanolamine and triisopropanolamine, and trihydric and/or polyhydric alcohols, such as glycerol, trimethylolpropane and pentaerythritol. Other suitable chain extenders and crosslinking agents are low-molecular-weight ethoxylation and/or propoxylation products, for example those having a molecular weight of less than 300, of the abovementioned polyhydric alcohols, alkylene glycols, alkanolamines and of aliphatic and/or aromatic diamines.

Preferred chain extenders are alkanediols, in particular 1,4-butanediol and/or 1,6-hexanediol, and alkylene glycols, in particular ethylene glycol and propylene glycol, and preferred crosslinking agents are trihydric alcohols, in particular glycerol and trimethylolpropane, dialkanolamines, in particular diethanolamine, and trialkanolamines, in particular triethanolamine.

The chain extenders and/or crosslinking agents preferably used for the preparation of isocyanate semiprepolymers for flexible PU foams can be employed, for example, in amounts of from 2 to 60% by weight, preferably from 10 to 40% by weight, based on the total weight of the polyhydroxyl compounds (A).

The polyhydroxyl compounds (A) are used in accordance with the invention in combination with branched, cyclic or preferably linear, olefinically unsaturated or preferably saturated monoalcohols having 1 to 25 carbon atoms (A1i), preferably 12 to 20 carbon atoms, or hydroxyketones (A1ii), preferably β-hydroxyketones, or mixtures of said monoalcohols (A1i), in particular linear, saturated monoalcohols, and hydroxyketones (A1ii). For the preparation of mixtures of the polyhydroxyl compounds (A), for example of the hydroxyl-containing polyesters (A2) or polyoxyalkylenepolyols (A3) or preferably mixtures of (A2) and (A3), and the monoalcohols (A1i) and/or hydroxyketones (A1ii) essential to the invention, these are expediently used in a [(A) without (A1)]: (A1i) and/or (A1ii) weight ratio of from 20:1 to 1.0:1, preferably from 15:1 to 1.5:1, in particular from 10:1 to 1.5:1.

Examples of suitable monoalcohols (A1i) having 1 to 25 carbon atoms, preferably 12 to 20 carbon atoms, are linear or branched, saturated, monohydric alcohols, for example methanol, ethanol, n- and isopropanol, butanols, pentanols, hexanols, n-octanols, 2-octanol, decyl alcohol, dodecyl alcohol, myristyl alcohol, cetyl alcohol and stearyl alcohol, linear or branched, olefinically unsaturated, monohydric alcohols, for example allyl alcohol, 2-buten-1-ol, 3-buten-1-ol and cinnamyl alcohol, and cyclic, saturated or olefinically unsaturated monohydric alcohols, for example cyclopentanol, cyclopentenol, cyclohexanol, cyclohexenol and cycloheptanol. The monoalcohols can be used in technical-grade or preferably in pure form, and individually or as mixtures of at least two monoalcohols. Preference is given to dodecyl alcohol and stearyl alcohol.

Examples of suitable hydroxyketones (A1ii) are the ketone dimerization products obtainable in a basic reaction medium, for example the 4-methyl-4-hydroxypentan-2-one obtainable by dimerization of acetone and β-hydroxyketones of the formula

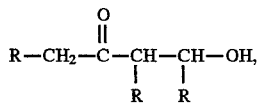

where the R radicals are identical or different and are hydrogen, phenyl, alkyl having 1 to 20 carbon atoms, preferably 1 to 12 carbon atoms, phenylalkyl having 1 to 14 carbon atoms, preferably 1 to 10 carbon atoms, in the alkyl radical or halogen, preferably chlorine and/or bromine, obtainable by aldol-analogous reactions of ketones and aldehydes. Examples of β-hydroxyketones which may be mentioned are 4-hydroxypentan-2-one and preferably 4-methyl-4-hydroxypentan-2-one, hydroxyacetone and acetyl methyl carbinol.

The hydroxyketones (A1ii), preferably β2-hydroxyketones, can, analogously to the monoalcohols (A1i), be used individually or in the form of mixtures.

B) The organic polyisocyanates which can be used, as stated above, for the preparation of the isocyanate semiprepolymers are, for example, aliphatic, cycloaliphatic or preferably aromatic polyisocyanates.

The following may be mentioned by way of example: alkylene diisocyanates having 4 to 12 carbon atoms in the alkylene radical, such as 1,12-dodecane diisocyanate, 2-ethyltetramethylene 1,4-diisocyanate, 2-methylpentamethylene 1,5-diisocyanate, 2-ethyl-2-butylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), 2,4- and 2,6-hexahydrotolylene diisocyanate and the corresponding isomer mixtures, 4,4'-, and 2,4'- and 2,2'-dicyclomethane diisocyanate and the corresponding isomer mixtures, and preferably aromatic di- and polyisocyanates, for example 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI) and mixtures of crude MDI and tolylene diisocyanates. The organic di- and polyisocyanates can be used individually or in the form of mixtures.

Organic polyisocyanates which have proven highly successful are mixtures of diphenylmethane diisocyanates and polyphenyl-polymethylene polyisocyanates, preferably those having a diphenylmethane diisocyanate content of at least 45% by weight, for example from 45 to 95% by weight, in particular from 48 to 60% by weight, and such crude MDI compositions are therefore particularly preferred.

C) The isocyanate semiprepolymers which can be used in accordance with the invention can be prepared in the absence or preferably in the presence of catalysts (C), which are preferably compounds which greatly accelerate the reaction of the hydroxyl-containing compounds (A) with the organic polyisocyanates (B). Examples of suitable catalysts are organo-metallic compounds, preferably organotin compounds, such as tin(II) salts of organic carboxylic acids, for example tin(II) acetate, tin(II) octanoate, tin(II) ethylhexanoate and tin(II) laurate, and the dialkyltin(IV) salts of organic carboxylic acids, for example dibutyltin diacetate, dibutyltin dilaurate, dibutyltin maleate, dioctyltin diacetate and dibutyltin dimercaptide, and strongly basic a/nines, for example amidines, for example 2,3-dimethyl-3,4,5,6-tetrahydropyrimidine, tertiary amines, for example triethylamine, tributylamine, dimethylbenzylamine, N-methyl-, N-ethyl- and N-cyclohexylmorpholine, di(morpholinoethyl) ether, N,N,N',N'-tetramethylethylenediamine, N,N,N',N'-tetramethylbutanediamine, N,N,N',N'-tetramethyl-1,6-hexanediamine, di-(4-dimethylaminocyclohexyl)methane, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, alkanolamine compounds, such as triethanolamine, triisopropanolamine, N-methyl- and N-ethyldiethanolamine and dimethylethanolamine, tris(dialkylaminoalkyl)-s-hexahydrotriazines, in particular tris(N,N-dimethylaminopropyl)-s-hexahydrotriazine, tetraalkylammonium hydroxides, such as tetramethylammonium hydroxide and preferably 1,4-diazabicyclo[2.2.21]octane. The preferred amount of catalyst or catalyst combination is from 0.001 to 5% by weight, in particular from 0.05 to 2% by weight, based on the weight of the polyhydroxyl compound (A).

The isocyanate semiprepolymers which can be used in accordance with the invention can furthermore be prepared in the absence or in the presence of surfactants (D), blowing agents (E) and further additives (F). In a preferred preparation variant, however, these formative components (D) to (F) are expediently incorporated into the separately prepared isocyanate semiprepolymer.

D) Examples of suitable surfactants (D) are compounds which serve to support homogenization of the isocyanate semiprepolymer mixtures and may also be suitable for regulating the cell structure of the PU foams. Examples which may be mentioned are emulsifiers, such as the sodium salts of castor oil sulfates or of fatty acids, and salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as pyrogenic silicic acid, paraffins, fatty alcohols and dimethylpolysiloxanes. Suitable compounds for improving the emulsification action, the cell structure and/or the stabilization of the foam are furthermore oligomeric polyacrylates containing polyoxyalkylene and fluoroalkane radicals as side groups. The surfactants are usually used in amounts of from 0.01 to 5 parts by weight, based on 100 parts by weight of the polyhydroxyl compounds (A).

E) Suitable blowing agents (E) are gases which are liquid at room temperature and liquids, in each case inert toward the liquid isocyanate semiprepolymers and having boiling points of below 50° C., in particular from −50° C. to 30° C., at atmospheric pressure, and mixtures of gaseous and liquid blowing agents. Examples of preferred such gases and liquids are alkanes, for example propane, n- and isobutane, n- and isopentane, preferably technical-grade mixtures of n- and isopentane, and cyclopentane, alkyl ethers, for example dimethyl ether, diethyl ether and methyl isobutyl ether, alkyl carboxylates, for example methyl formate, and halogenated hydrocarbons, for example dichlorofluoromethane, trifluoromethane, 1,1-dichloro-1-fluoroethane, monochlorotrifluoroethane, monochlorodifluoroethane, difluoroethane, dichlorotrifluoroethane, monochlorotetrafluoroethane, pentafluoroethane, tetrafluoro-ethane and dichloromonofluoroethane.

Other blowing agents which can be used are substituted or unsubstituted monocarboxylic acids having 1 to 30 carbon atoms, preferably aliphatic monocarboxylic acids having 1 to 10 carbon atoms. Examples of such blowing agents which may be mentioned are substituted or unsubstituted monocarboxylic acids, for example formic acid, 2-chloropropionic acid, 3-chloropropionic acid, 2,2-dichloropropionic acid, hexanoic acid, cyclohexanoic acid, dodecanoic acid, palmitic acid, stearic acid, oleic acid, glycolic acid, ricinoleic acid, tall oil fatty acid and preferably propionic acid, 2-ethylhexanoic acid and in particular acetic acid. The organic carboxylic acids which react with the isocyanates to form ureas, acyl ureas and carbon dioxide are expediently used in combination with alkali metal or ammonium salts of organic carboxylic acids or tris (dialkylaminoalkyl)-s-hexahydrotriazines as catalysts. The formation of carbon dioxide can increase the pressure cushion of blowing agent in the pressure vessel in an advantageous manner and the formation of urea groups can modify the mechanical properties of the PU foam.

The blowing agents mentioned by way of example can be used individually or as mixtures. Blowing agents which are not used are chlorofluorocarbons, which damage the ozone layer.

Gases and/or liquids having boiling points of below 50° C. can also be used as a mixture with (cyclo)alkanes, for example hexane and cyclohexane, and alkyl carboxylates, for example ethyl formate, having boiling points of above 50° C. so long as the blowing agent mixture has a boiling point of below 38° C. and has a blowing action which is sufficient to force the pressurized isocyanate semiprepolymer mixture out of the pressure container and to expand it to form a PU foam. Preferred blowing agents are mixtures of alkanes, in particular butane and/or propane and a liquid having a boiling point of below 50° C. The requisite amount of blowing agent or blowing agent mixture can be determined experimentally in a simple manner as a function of the type of blowing agent or blowing agent mixture and the mixing ratios. The blowing agent is usually used in an amount of from 10 to 40% by weight, preferably 13 to 30% by weight, based on the weight of the isocyanate semiprepolymer. The blowing agents are virtually entirely in liquid form in the pressurized isocyanate semiprepolymer mixture.

F) Further additives (F) can be incorporated into the isocyanate semiprepolymers instead of or preferably in addition to the surfactants (D). Examples which may be mentioned are flameproofing agents, plasticizers, fillers, dyes, pigments, antihydrolysis agents and fungistatic and/or bacteriostatic substances.

Examples of suitable flameproofing agents are diphenyl cresyl phosphate, tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl)ethylene diphosphate.

In addition to the above halogen-substituted phosphates, it is also possible to use inorganic flameproofing agents, for example aluminum oxide hydrate, antimony trioxide, arsenic oxide, ammonium polyphosphate, expandable graphite and calcium sulfate, or cyanuric acid derivatives, for example melamine, or mixtures of at least two flameproofing agents, for example ammonium polyphosphates and melamine and/or expandable graphite and, if desired, starch, to flameproof the PU foams produced from isocyanate semiprepolymer mixtures. In general, it has proved expedient to use from 5 to 50 parts by weight, preferably from 10 to 40 parts by weight, of flameproofing agents or mixtures, based on 100 parts by weight of the polyhydroxyl compounds.

It may also be advantageous to incorporate plasticizers into the isocyanate semiprepolymer mixture in order to reduce the tendency of the PU foams produced toward brittleness. Examples of plasticizers which can be used are the plasticizing agents known per se, for example butyl benzyl phthalate, dioctyl phthalate, inter alia. However, it has proven advantageous to use, for example, the above-mentioned hydroxyl-containing polyesters or phosphorus- and/or halogen-containing compounds, for example the abovementioned flameproofing agents, since these additionally increase the flame resistance of the PU foams.

For the purposes of the present invention, fillers, in particular reinforcing fillers, are taken to mean conventional organic and inorganic fillers and reinforcing agents known per se. Specific examples which may be mentioned are inorganic fillers, for example silicate minerals, for example phyllosilicates, such as antigorite, serpentine, hornblends, amphiboles, chrysotile, zeolites and talc; metal oxides, for example kaolin, aluminum oxides, aluminum silicate, titanium oxides and iron oxides, metal salts, for example chalk, barytes, and inorganic pigments, such as cadmium sulfide and zinc sulfide, and glass particles. Examples of suitable organic fillers are carbon black, melamine, collophony, cyclopentadienyl resins and graft polymers.

The inorganic and organic fillers can be used individually or as mixtures and are advantageously introduced into the reaction mixture in amounts of from 0.5 to 50% by weight, preferably from 1 to 10% by weight, based on the weight of the isocyanate semiprepolymer.

Further details on the abovementioned other conventional additives (F) can be obtained from the specialist literature, for example the monograph by J. H. Saunders and K. C. Frisch, High Polymers, Volume XVI, Polyurethanes, parts 1 and 2, Interscience Publishers, 1962 and 1964 respectively, or the Kunststoff-Handbuch, Polyurethane, Volume VII, Carl-Hanser-Verlag, Munich, Vienna, 1st and 2nd Editions, 1966 and 1983 respectively.

The novel pressurized isocyanate semiprepolymer mixtures can be prepared by known processes.

In one process variant, the isocyanate semiprepolymer can be prepared, for example, by reacting the polyhydroxyl compounds (A) with the polyisocyanates (B) in the requisite amounts in the presence or absence of a catalyst at from 20° to 120° C., preferably at from 40° to 90° C., and subsequently mixed, if desired, with surfactants (D) and further additives (F), introduced into a pressure container and charged therein with the blowing agent (E). In another process variant, the isocyanate semiprepolymer preparation is carried out in the presence or absence of catalysts and, if desired, surfactants (D), other additives (F) and in the presence of blowing agents (E) in a suitable pressure container. The isocyanate semiprepolymer mixture obtained can then be transferred into suitable containers of various sizes, for example aerosol cans having a capacity of, for example, from 0.5 to liters or pressure containers having a capacity of, for example, from 50 to 100 liters, as is usual for industrial sectors. In a preferred embodiment, the polyhydroxyl compounds (A) are mixed with the catalysts (C), surfactants (D) and, if desired, further additives (F) to give a polyol component. The polyol component is mixed with the organic polyisocyanates in a suitable container, and the resultant mixture is charged with the blowing agent (E) with the aid of a filling device. The isocyanate semiprepolymer mixture is formed on mixing of the formative components.

In order to produce the dimensionally stable PU foams, the pressurized isocyanate semiprepolymer mixture is depressurized to atmospheric pressure with the aid of a suitable device, for example a valve. The internal pressure in the container forces the isocyanate semiprepolymer mixture out. The isocyanate semiprepolymer mixture expands under atmospheric pressure and cures rapidly through reaction with the atmosphere, in particular the water vapor present in the atmosphere.

The novel pressurized, blowing-agent-containing isocyanate semiprepolymer mixtures can be used, for example, for the production of one-component PU foams, which can be used, for example, for filling cavities and gaps, as a sealant, as an insulation material and for fixing and installing doors and windows.

The essentially dimensionally stable PU foams usually have a density of from 15 to 40 g/liter, preferably from 17 to 30 g/liter, depending on the blowing agents and their amounts.

EXAMPLES

Example 1

The polyol component used was a mixture comprising:
2750 parts by weight of castor oil having a hydroxyl number of 165,
1200 parts by weight of a glycerol-initiated polyoxypropylene-polyoxyethylene-polyol having a hydroxyl number of 42,
400 parts by weight of fatty acid methyl ester,
450 parts by weight of hexanol,
120 parts by weight of a polyoxyalkylene glycol-polysiloxane copolymer as foam stabilizer, and
45 parts by weight of di(2-morpholinoethyl) ether.

The polyol component contained 10.23% by weight of hexanol, based on the total weight of the hydroxyl compounds.

277 g of the polyol component and
402 g of a mixture of diphenylmethane diisocyanates and polyphenyl-polymethylene polyisocyanates (crude MDI) having a diphenylmethane diisocyanate content of 48% by weight, based on the total weight of the mixture, were introduced into a 1 liter tinplate can, which was sealed in a gas-tight manner by means of a valve, and the following were introduced one after the other into the polyol/crude MDI mixture through the valve with the aid of a gas-filling device and with vigorous shaking:

14 g of dimethyl ether,
42 g of a mixture of approximately 80% by weight of butane and approximately 20% by weight of propane and
83 g of difluoroethane.

The liquid-gas blowing agent content in the isocyanate semiprepolymer mixture was 17% by weight.

In order to complete the isocyanate semiprepolymer formation, the can with contents was kept at 50° C. for 24 hours.

The can valve was provided with a plastic ring with external thread. With the aid of this plastic ring external thread, the can was screwed onto a foaming gun, and the discharge rate (amount discharged per time unit) was measured as an indirect quality criterion for the viscosity of the isocyanate semiprepolymer mixture. The discharge rate was 85 g/10 seconds.

Comparative Example I

The procedure was similar to that of Example 1, but no hexanol was used as monoalcohol.

The discharge rate of the isocyanate semiprepolymer mixture was 45 g/10 seconds.

Example 2

The polyol component used was a mixture comprising:
160 parts by weight of a poly(ethylene glycol adipate) having a hydroxyl number of 56,
50 parts by weight of a glycerol-initiated polyoxypropylenepolyol having a hydroxyl number of 400,
50 parts by weight of a glycerol-initiated polyoxypropylene-polyoxyethylene-polyol having a hydroxyl number of 42,
50 parts by weight of lauryl alcohol,
20 parts by weight of a polyoxyalkylene glycol-polysiloxane copolymer as foam stabilizer,
5 parts by weight of di(2-morpholinoethyl) ether and
160 parts by weight of trichloropropyl phosphate.

The polyol component contained 16.13% by weight of lauryl alcohol as monoalcohol, based on the total weight of the hydroxyl compounds.

320 g of the polyol component and
415 g of the crude MDI described in Example 1 were introduced into a 1 liter tinplate can as described in Example 1, and the mixture was charged successively with 42 g of dimethyl ether and
98 g of tetrafluoroethane as blowing agent, the can contents being shaken vigorously after each addition of blowing agent.

The liquid-gas blowing agent content in the isocyanate semiprepolymer mixture was 16% by weight.

In order to complete the isocyanate semiprepolymer formation, the can with contents was kept at 50° C. for 24 hours, and the discharge rate was then determined as described in Example 1, and was 120 g/10 seconds.

Comparative Example II

The procedure was similar to that of Example 2, but no lauryl alcohol was used as monoalcohol.

The discharge rate of this isocyanate semiprepolymer mixture was 68 g/10 seconds.

Example 3

The polyol component used was a mixture comprising:

700 parts by weight of castor oil having a hydroxyl number of 165, 900 parts by weight of a glycerol-initiated polyoxypropylene-polyoxyethylene-polyol having a hydroxyl number of 42, 500 parts by weight of a soybean oil polyol having a hydroxyl number of 150, 700 parts by weight of a fatty acid glycerol ester having a hydroxyl number of 350, 450 parts by weight of 4-methyl-4-hydroxypentan-2-one, 120 parts by weight of a polyoxyalkylene glycol-polysiloxane copolymer as foam stabilizer, and 45 parts by weight of di(2-morpholinoethyl) ether 1500 parts by weight of trichloropropyl phosphate and 20 parts by weight of formic acid.

The polyol component contained 13.85% by weight of 4-methyl-4-hydroxypentan-2-one as β-hydroxy-ketone, based on the total weight of the hydroxyl compounds.

305 g of the polyol component and 440 g of a mixture of diphenylmethane diisocyanates and polyphenyl-polymethylene polyisocyanates (crude MDI) having a diphenylmethane diisocyanate content of 48% by weight, based on the total weight of the mixture, were introduced into a 1 liter tinplate can, which was sealed in a gas-tight manner by means of a valve, and the following were introduced one after the other into the polyol/crude MDI mixture through the valve with the aid of a gas-filling device and with vigorous shaking:

22 g of dimethyl ether, 22 g of a mixture of approximately 80% by weight of butane and approximately 20% by weight of propane and 67 g of tetrafluoroethane.

The liquid-gas blowing agent content in the isocyanate semiprepolymer mixture was 13% by weight.

In order to complete the isocyanate semiprepolymer formation, the can with contents was kept at 50° C. for 24 hours, and the discharge rate was then determined as described in Example 1, and was 95 g/10 seconds.

Comparative Example III

The procedure was similar to that of Example 3, but no 4-methyl-4-hydroxypentan-2-one was used.

The discharge rate of the isocyanate semiprepolymer mixture was 43 g/10 seconds.

Example 4

The polyol component used was a mixture comprising:

80 parts by weight of a glycerol-initiated polyoxypropylenepolyol having a hydroxyl number of 400, 200 parts by weight of a soybean oil polyol having a hydroxyl number of 150, 690 parts by weight of a glycerol-initiated polyoxypropylenepolyoxy-ethylene-polyol having a hydroxyl number of 42, 190 parts by weight of a fatty acid glycerol ester having a hydroxyl number of 350, 200 parts by weight of 4-methyl-4-hydroxypentan-2-one, 60 parts by weight of stearyl alcohol, 100 parts by weight of arachidonic acid, 50 parts by weight of a polyoxyalkylene glycol-polysiloxane copolymer as foam stabilizer, 20 parts by weight of di(2-morpholinoethyl) ether and 600 parts by weight of trichloropropyl phosphate.

The polyol component contained 18.31% by weight of stearyl alcohol as monoalcohol and 4-methyl-4-hydroxypentan-2-one as β-hydroxyketone, based on the total weight of the hydroxyl compounds.

325 g of the polyol component and 430 g of the crude MDI described in Example 1 were introduced into a 1 liter tinplate can as described in Example 1, and the mixture was charged successively with 22 g of dimethyl ether, 22 g of a mixture of approximately 80% by weight of butane and approximately 20% by weight of propane, and 67 g of tetrafluoroethane as blowing agent.

The liquid-gas blowing agent content in the isocyanate semiprepolymer mixture was 13% by weight.

In order to complete the isocyanate semiprepolymer formation, the can with contents was kept at 50° C. for 24 hours, and the discharge rate was then determined as described in Example 1, and was 85 g/10 seconds.

Comparative Example IV

The procedure was similar to that of Example 4, but no 4-methyl-4-hydroxypentan-2-one or stearyl alcohol was used.

The discharge rate of this isocyanate semiprepolymer mixture was 38 g/10 seconds.

Determination of the dimensional stability of PU foams produced from the isocyanate semiprepolymer mixtures.

Three test specimens were produced from each of the isocyanate semiprepolymer mixtures prepared in tinplate cans as described in Examples 1 to 4.

For comparative purposes, the polyol components in Comparative Examples I to IV were each mixed with 8% by weight, based on the weight of the polyol component, of methyl ethyl ketone, a conventional solvent and diluent described in the patent literature, in order to achieve discharge rates comparable with the novel isocyanate semiprepolymer mixtures.

Isocyanate semiprepolymer mixtures modified in this way were introduced into 1 liter tinplate cans as described in Comparative Examples I to IV and converted into PU foams by depressurization.

The mold for determination of dimensional stability comprised two chipboards measuring 250×115 mm with a thickness of 18 mm and veneered on both sides and with an open gap of 20 mm due to wood spacers arranged laterally.

The test specimens were produced by foam-filling the water-moistened gap between the chipboards. After the PU foam had cured, the foam which had emerged from the mold was cut off and the spacers were removed. The arithmetic mean of the separations of the chipboards, measured at the corners of the test specimens, gives the starting value for measurement of the dimensional stability. After the test specimens had been stored for 14 days at 40° C. and a relative atmospheric humidity of 90%, the measurement was repeated. In each case two measurements per test specimen (before and after storage) were used to determine the relative change in %, which is used as a measure of the dimensional stability. The mean of the dimensional stabilities in % measured on 3 test specimens gives the measurement value given in the table below. Test specimens having a measurement value of less than 10% have adequate dimensional stability.

Measurement of the dimensional stability by the above method on PU foams produced from the isocyanate semiprepolymers of Examples 1 to 4 and the isocyanate semiprepolymers of Comparative Examples I to IV which had been modified by addition of methyl ethyl ketone (MEK) gave the measurement results shown in the table below.

TABLE

| Isocyanate semiprepolymer mixture from | Dimensional stability [%] |
| --- | --- |
| Example 1 | 3.8 |
| Comparative Example I (modified with MEK) | 16.5 |
| Example 2 | 4.3 |
| Comparative Example II (modified with MEK) | 19.2 |
| Example 3 | 2.8 |
| Comparative Example III (modified with MEK) | 14.6 |
| Example 4 | 3.2 |
| Comparative Example IV (modified with MEK) | 15.8 |

We claim:

1. A pressurized, blowing-agent-containing, single-component, isocyanate semiprepolymer mixture obtained by reacting A) at least one polyhydroxyl compound with B) at least one organic polyisocyanate in a sealed reactor in the presence of at least one blowing agent or by treating the isocyanate semiprepolymer formed in the absence of blowing agent with at least one blowing agent, wherein the polyhydroxyl compound (A) is used in combination with a β-hydroxyketone (A1ii) of the formula

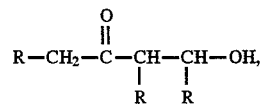

where the radicals R are identical or different and are hydrogen, phenyl, alkyl having 1 to 20 carbon atoms, phenylalkyl having 1 to 14 carbon atoms in the alkylene radical or halogen.

2. A pressurized, blowing-agent-containing, single-component, isocyanate semiprepolymer mixture obtained by reacting A) at least one polyhydroxyl compound with B) at least one organic polyisocyanate in a sealed reactor in the presence of at least one blowing agent or by treating the isocyanate semiprepolymer formed in the absence of blowing agent with at least one blowing agent, wherein the polyhydroxyl compound (A) is used in combination with 4-methyl-4-hydroxypentan-2-one (A1ii).

* * * * *